Patented Feb. 28, 1933

1,899,304

UNITED STATES PATENT OFFICE

OTTO BAYER, OF FRANKFORT-ON-THE-MAIN, GERMANY, ASSIGNOR TO GENERAL ANILINE WORKS, INC., OF NEW YORK, N. Y., A CORPORATION OF DELAWARE

DICHLORO-METHYL-ANTRAQUINONES AND PROCESS OF MAKING SAME

No Drawing. Application filed February 17, 1931, Serial No. 516,505, and in Germany February 22, 1930.

My present invention relates to dichloro-methyl-anthraquinones and process of making same.

This process comprises introducing gaseous chlorine into a solution containing sulfuric acid and 2-methyl-anthraquinone until a test shows that 2 atomic proportions of chlorine have been absorbed; i. e. introducing at least 2 molecular proportions of chlorine. The sulfuric acid solution used may contain sulfuric acid anhydride or also diluents as water or acetic acid. Chlorine carriers as iodine or antimony pentachloride may be further added. The chlorination is carried out at a temperature ranging from room temperature up to 150°, advantageously at about 70° till above 100°.

Thereby a mixture of isomeric dichloro-methyl-anthraquinones is obtained containing probably as main portions 1.5- and 1.8-dichloro-2-methyl-anthraquinone of the formulæ:

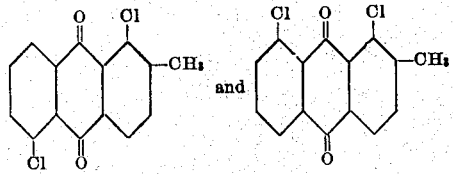

The proportion of the components of this mixture varies according to the concentration of the sulfuric acid and according to the presence and kind of the chlorine carrier. The mixture may be divided into its components by treating it with suitable organic solvents or by a fractional precipitation of the sulfuric acid solution. For technical purposes the isolation of the components may be dispensed with, but the mixture may be used as such for many reactions, especially for the production of dyestuffs.

Nearly the same mixture of dichloro-methyl-anthraquinones is obtained by carrying out the chlorination in two steps: At first 1-methyl-anthraquinone is converted into 1-chloro-2-methyl-anthraquinone for instance in the manner described in German Patent No. 269,249 and its addition No. 293,156 and the formed 1-chloro-2-methyl-anthraquinone (in a pure or crude form) is treated with chlorine in a sulfuric acid solution.

The introduction of a second chlorine atom into the nucleus of a mono-chlorinated 2-methyl-anthraquinone is not known hitherto though 2-methyl-anthraquinone has already been treated with chlorine in a sulfuric acid solution (U. S. Patent 1,504,164). Such an introduction is a surprising fact; there was much more to be expected ω-chloro-methyl-derivatives since the hydrogen atoms of the methyl group are known to be easily replaced by halogen (see U. S. Patent No. 893,507).

In order to further illustrate my invention the following examples are given the parts being by weight and all temperatures in centigrade degrees, but I wish to be understood that my invention is not limited to the examples given, nor to the exact conditions stated therein.

Example 1

Into a solution of 50 parts of 2-methyl-anthraquinone and 0.3 parts of iodine in 500 parts of sulfuric acid monohydrate and 30 parts of fuming sulfuric acid of 65% $SO_3$, chlorine is introduced as about 100° while stirring until an increase in weight of 16.0–16.5 parts, or until the anthraquinone compound contains 24.3–24.8% chlorine. Then the reaction product is fractionally precipitated from the sulfuric acid solution by a gradual addition of water. The crude product thus obtained represents light yellowish crystals soluble in organic solvents, it sinters at 130° and melts at 135–140°. This product or also the sulfuric acid reaction mass may be immediately used for further transformation processes.

Example 2

2-methyl-anthraquinone is treated with sulfuryl chloride in the manner described in German Patent No. 269,249. 50 parts of the crude 1-chloro-2-methyl-anthraquinone thus obtained and 0.2 parts of iodine are dissolved in 300 parts of fuming sulfuric acid containing 3% of $SO_3$. Into this solution gaseous chlorine is introduced at 70° until one atomic proportion of chlorine has been absorbed. The reaction mass is further treated according to Example 1. The product thus obtained is nearly identical to that of Example 1.

*Example 3*

50 parts of 2-methyl-anthraquinone are dissolved in 400 parts of sulfuric acid of 85% strength and chlorine is introduced at about 100°, while an increased surface of the mass is maintained for instance by stirring. The introduction is interrupted when 2 atomic amounts of chlorine have been absorbed. In contradisctinction to the foregoing examples using a sulfuric acid containing $SO_3$, in this case no more chlorine is absorbed even if an excess of chlorine is introduced. The product is isolated by pouring the mass into water, filtering and washing. It melts, after sintering at 123°, between 130–140°.

I claim:—

As new articles of manufacture the di-chloro-2-methyl-anthraquinones corresponding to the formulæ:

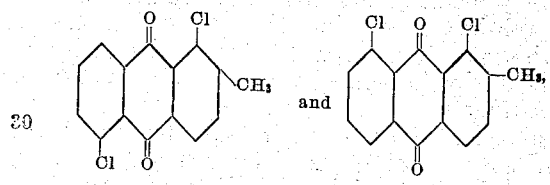

which articles represent light yellowish crystals soluble in organic solvents, sintering at 123–130° and melting at 130–140°.

In testimony whereof, I affix my signature.

OTTO BAYER.